United States Patent [19]

Berthold et al.

[11] 4,272,677
[45] Jun. 9, 1981

[54] METHOD AND APPARATUS FOR THE AUTOMATIC STABILIZATION OF DRIFT IN RADIATION MEASUREMENTS

[75] Inventors: Fritz Berthold, Pforzheim; Helmut Kubisiak, Wildbad-Nonnenmiss, both of Fed. Rep. of Germany

[73] Assignee: Laboratorium Prof. Dr. Rudolf Berthold, Wildbad, Fed. Rep. of Germany

[21] Appl. No.: 47,723

[22] Filed: Jun. 12, 1979

[30] Foreign Application Priority Data

Jun. 16, 1978 [DE] Fed. Rep. of Germany ....... 2826484

[51] Int. Cl.³ ............................................. G01D 18/00
[52] U.S. Cl. .................................. 250/252; 250/369; 250/386
[58] Field of Search ................... 250/252, 358 R, 362, 250/363 S, 369, 386, 387, 388

[56] References Cited

U.S. PATENT DOCUMENTS

| | | | |
|---|---|---|---|
| 3,179,801 | 4/1965 | Scherbatskoy | 250/252 X |
| 3,270,205 | 8/1966 | Ladd et al. | 250/362 |
| 3,337,737 | 8/1967 | Eberhardt | 250/252 X |
| 3,953,736 | 4/1976 | Kubisiak et al. | 250/358 R |
| 4,079,257 | 3/1978 | Jatteau et al. | 250/252 X |

FOREIGN PATENT DOCUMENTS

| | | | |
|---|---|---|---|
| 1809520 | 2/1970 | Fed. Rep. of Germany . | |
| 2359732 | 6/1974 | Fed. Rep. of Germany . | |
| 2754309 | 6/1978 | Fed. Rep. of Germany | 250/359 |
| 1067053 | 4/1967 | United Kingdom . | |
| 1226924 | 3/1971 | United Kingdom . | |

OTHER PUBLICATIONS

Ascoli, "Su un Dispositivo per la Stabilizzazione dei Fotomoltiplicatori", Il Nuovo Cimento, vol. IX, No. 7, 1952, pp. 615-617.
de Waard, "Stabilizing Scintillation Spectrometers with Counting Rate Difference Feedback", Nucleonics, vol. 13, No. 7, Jul. 1955, pp. 36-41.
Haun et al, Nuclear Instruments and Methods, vol. 8, No. 3, 1960, pp. 331-338.
Soini, Review of Scientific Instruments, vol. 46, No. 8, Aug. 1975, pp. 980-984.

Primary Examiner—Davis L. Willis
Attorney, Agent, or Firm—Spencer & Kaye

[57] ABSTRACT

A method and apparatus for automatically stabilizing drift in radiation measurements which employ a detector whose pulse amplitude corresponds to the energy absorbed by the detector, involves the use of a peak produced in the pulse amplitude spectrum by individual electrons. The peak is at the low energy end of the spectrum and is drift stable. It can be produced by for example a direct or indirect light source such as a light emitting diode, by the phosphorescence of e.g. a sodium iodide crystal used as a scintillation crystal in nuclear radiation measurement, or by spontaneous surface emission within the detector, which is suitably a photomultiplier. The apparatus includes a determination device to determine the position of the drift stable peak and a control device to control the detector in response to the output of the determination device.

34 Claims, 3 Drawing Figures

METHOD AND APPARATUS FOR THE AUTOMATIC STABILIZATION OF DRIFT IN RADIATION MEASUREMENTS

FIELD OF THE INVENTION

The present invention relates to a method of control for automatically stabilising drift in radiation measurement and to control apparatus therefor.

BACKGROUND OF THE INVENTION

In nuclear radiation measurement techniques and also in photometry use is made of detectors such as scintillation counters, proportional counter tubes, semiconductors, or photomultipliers having internal amplification, which supply pulses whose pulse amplitude corresponds to the energy absorbed by the detector. A particular difficulty arises by reason of drift in such radiation measurement means, especially because of variations in internal amplification. The latter variation gives rise to a variation in pulse heights and consequently to a displacement of the energy lines or energy peaks with respect to the adjusted response thresholds of pulse registration, and hence to faulty measurements of intensity. These faults can of course be kept within acceptable limits by regular checking with calibrating radiation sources and manual adjustment. However, automatic control methods and devices for stabilisation of drift are preferable.

For the measurement of cosmic radiation, for example, it is known to use a gamma emitter as a calibrating radiation source and, by means of an integral discriminator and a control device, to maintain a constant rate of pulses exceeding the threshold of the integral discriminator. In this case the pulses produced by the cosmic radiation being measured are greater than the pulses of the calibration radiation and the fluctuating rate of the radiation being measured should be sufficiently low in relation to the pulse rate produced by the calibrating radiation source (R. Ascoli, *Il Nuovo Cimento,* Vol. IX, No. 7 (1952), Pages 615-617. Instead of a gamma emitter it is also known to use as the external reference radiation source an alpha emitter, particularly by doping a scintillation crystal of a photomultiplier with Americium 241 (British Patent Specification No. 1,067,053).

The use of external radiation sources however involves outlay and is expensive, and may also give rise to the super-imposition of reference peaks on the spectrum that is to be measured.

When pulsed light sources are, for example, used as external reference radiation sources, these have the disadvantage of themselves being subject to drift.

In order to avoid such disadvantages it is already known (German laid-open Specification No. 18 09 520) for the radiation source being measured to be used itself as a reference radiation source and for the controlling variable used for the automatic stabilisation of drift to be derived from a peak of the pulse amplitude spectrum. For this to be possible, however, the pulse amplitude spectrum of the radiation measured must, of course, have a peak suitable for the control process.

SUMMARY OF THE PRESENT INVENTION

It is an object of the present invention to provide a widely applicable control method and control apparatus for drift stabilisation in radiation measurement. It is a further object of the present invention to provide such a control method and apparatus which, in respect of outlay, are simple and inexpensive to put into practice.

According to a first aspect of the present invention there is provided a method of automatically stabilising drift in radiation measurement comprising the steps of: supplying radiation to a detector for absorption thereby; provision by the detector of pulses whose pulse amplitude corresponds to the energy of the radiation absorbed by the detector and extends over a pulse amplitude spectrum; deriving a control signal from a peak in the pulse amplitude spectrum, said peak being the peak resulting from individual electrons; and using the control signal to stabilise the drift.

When the method is applied to, for example, nuclear radiation measurement there exists in the range of very low energies, which are usually not taken into consideration but are associated with general noise—for instance in the case of photo-multipliers with sodium iodide crystals for example at an equivalent energy of 800 eV—a pronounced drift-stable peak which hitherto has not been taken into account at all and with which side peaks may even be associated. It has been ascertained that this peak is attributable to the initiation of individual electrons resulting from for example the phosphorescence or afterglow of the sodium iodide crystal. This phosphorescence or afterflow gives rise to transitions of energy from excited to unexcited conditions with the emission of individual photons, which in turn lead in, for example, the photomultiplier to the initiation of individual electrons with work functions of at the most a few eV. These individual electrons then pass under the uniform operating voltage to the first dynode of the photomultiplier and produce the previously mentioned pronounced drift-stable peak at low energy. Side band peaks may additionally occur if the photocathode was made by a spray or similar process which leads to the deposition of photoemissive coatings in other regions of the multiplier, for example on the first dynode.

Other examples of techniques to which the present method can be applied include light metering or photometry; gamma cameras and X-ray structure measurements.

Detectors which have drift phenomena of the kind referred to and to which the present invention can be applied include, in particular, detectors in which the internal amplification is subject to drift, as in the previously mentioned example of the dynodes of a photomultiplier. In the case of nuclear radiation measurement techniques, the detector may for example comprise not only a scintillation counter composed of a photomultiplier and a scintillator, such as a sodium iodide crystal, but also a proportional counter tube or a semiconductor with internal amplification. In the case of photometry, for example, use is made not only of photomultipliers but also of phototransistors, avalanche diodes or equivalent light amplifiers based on a different internal principle, such as for example image intensifiers or channel plate electron multipliers.

In the case of nuclear radiation measurements the spectrum of the substance being measured need not itself contain a pronounced peak, as was necessarily the case in German laid-open Specification No. 18 09 520. The peak utilised according to the present invention and originating from individual electrons lies moreover far below the energy range of interest in normal nuclear radiation spectra, and therefore cannot lead to superimpositions with the spectrum being measured, as occurs with known external reference radiation sources, for example the alpha radiation of Americium 241. In comparison with other known external reference sources subject to drift, moreover, the peak produced by the individual electron pulse amplitude spectrum provides the advantage of not itself being subject to drift.

In the case of photometry the measurement spectrum based on individual electron emission can itself be used as reference peak in accordance with the present invention.

In nuclear radiation measurement the present invention can be applied using one or more of a wide range of sources to produce the individual electron emission. Examples of sources include a direct or an indirect light source, such as a light emitting diode disposed either inside or outside the detector. The indirect light source may alternatively be a phosphorescent or persistent luminescent light source such as is provided by the sodium iodide crystal of a sodium iodide scintillation crystal used in conjunction with, for example, a photomultiplier as detector. Other examples of sources for the production of individual electrons in the detector include the spontaneous emission of electrons due to cathode noise, field emission, or exoelectrons, a proportional counter tube being appropriately used as the detector in the latter case.

In photometry sources for the production of individual electrons in the detector include photo-electrons, particularly those produced by the measurement signal itself; by fluorescent filters; by stray laser light; and/or by bioluminescence. A wide variety of quite different sources can thus be used, including some which are in any case produced during the measurement and which hitherto have not been used at all, and certainly not for drift stabilisation. Particular examples are the provision of a separate reference light source, for example, a faintly emissive light emitting diode which may, if appropriate, be used only indirectly by causing the light of a separate reference source, or even the light being measured in the case of photometry, to impinge first on a secondary light source, for example a fluorescent screen. In the case of nuclear radiation measurement with the aid of a scintillator, the phosphorescence or afterglow of the latter can conveniently be used as secondary induced photon emission. When use is made of spontaneous electron emission processes, this may for example be thermal noise.

According to a second aspect of the present invention there is provided radiation measurement apparatus comprising: a detector, a determination device and a control device; the detector being adapted to absorb radiation and to provide pulses whose pulse amplitude corresponds to the energy of the radiation absorbed by it and extends over a pulse amplitude spectrum; the determination device being connected to the output of the detector and adapted to derive a control signal from a peak in the pulse amplitude spectrum, said peak being the peak resulting from individual electrons; the control device being connected between the determination device and the detector and adapted automatically to stabilise the drift. The determination device may have two channel discriminators connected in parallel and a pulse rate comparator connected to their outputs or alternatively it may have an integral discriminator for determining a desired pulse rate. The apparatus preferably includes a measuring channel having a first pulse width discriminator for large pulse widths; and a stabilisation channel associated with the control device and having a second pulse width discriminator for small pulse widths. More preferably an amplifier is included in the apparatus to limit the pulse amplitudes in the stabilisation channel.

The present invention can be of very particular importance in photometry utilising photomultipliers, which is the most sensitive of all known photometry methods. There are basically two methods: firstly the amplification of the (integrated) output current, and secondly individual photon counting. The latter method, is, according to present knowledge, by far the more sensitive and stable method of measurement, although hitherto it has given rise to faulty measurements due to fluctuations arising from fluctuating amplification by the dynodes of photomultipliers. This may lead to drift of the measuring pulse above or below a discrimination limit, unless the drift is stabilised. The invention provides a particularly suitable means of achieving stabilisation.

DESCRIPTION OF THE PREFERRED EMBODIMENTS

Figure 1:
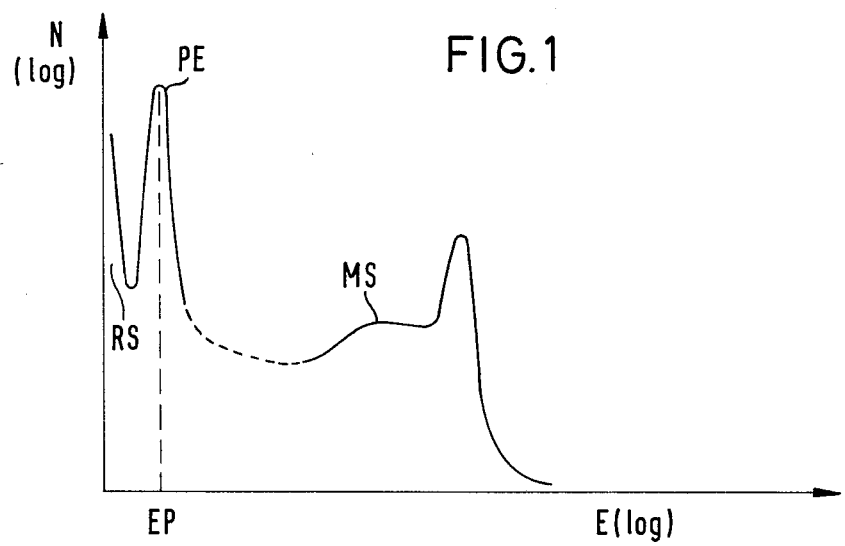
FIG. 1 shows a pulse amplitude spectrum having a peak produced by individual electrons and a measurement spectrum.

In FIG. 1 is shown a characteristic pulse spectrum having a measurement spectrum MS of the radiation which is to be measured and a spectrum of the peak PE produced by individual electrons. On the abscissa is plotted qualitatively, on a logarithmic scale, the pulse energy E, while the ordinate represents the pulse frequency N on a logarithmic scale.

In the lowest energy range a noise spectrum RS is seen first, which may for example be caused by electronic noise or by dynode noise. With increasing energy there then appears the peak PE which is produced by individual electrons, and which, according to the invention, is used as a reference line for the derivation of the controlled variable used to stabilise the drift automatically. The energy difference between the peak PE of the individual electrons and the measurement spectrum MS is shown in the pulse diagram by the interrupted transition to higher pulse energies. For the purpose of explaining the energy difference between the peak PE produced by the individual electrons and a value in the measurement spectrum it will be assumed that the peak in the measurement spectrum MS is produced by $Cs^{137}$. Making this assumption, the peak for $Cs^{137}$ lies at an energy E of about 663 keV, while the peak PE produced by individual electrons occurs at an equivalent energy of about 0.8 keV. This example shows particularly clearly that superimposition and consequently any disturbance of the measurement spectrum MS by the reference line, used for drift stabilisation, of the peak PE does not occur. In addition, it clearly illustrates that the peak PE, which previously was even sometimes counted with the noise, can have an amplitude which far exceeds the measurement spectrum, for example, in the case of photomultipliers with an NaI scintillator due to the phosphorescence of the latter.

Figure 2:
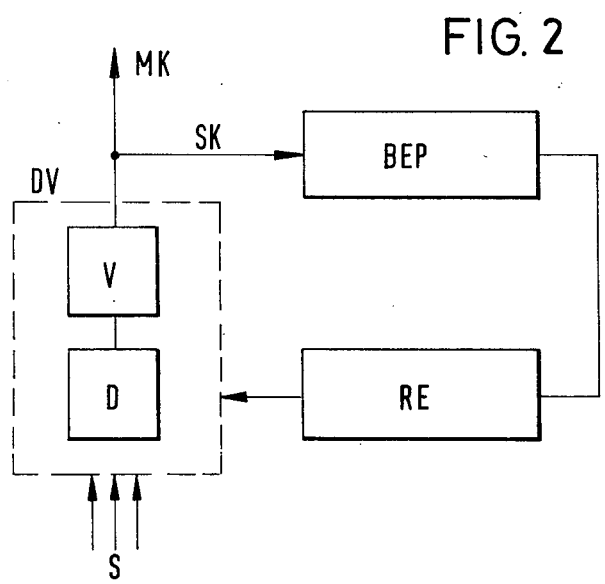
FIG. 2 shows a block circuit diagram of a control device for automatic stabilisation of drift of a detector having internal amplification.

Referring now to FIG. 2 the fundamental block circuit diagram includes a control device for automatic stabilisation of drift in the case of radiation measurement employing a detector whose pulse amplitude corresponds to the energy absorbed by it. A detector D having an internal amplifier V is used for measuring the radiation S. The signal occurring at the output of the detector having internal amplification (DV) is passed through a measurement channel MK to an analogue or digital display unit. The output signal occurring at the measurement channel MK is processed by means of the control device according to the invention and returned to the detector DV for drift stabilisation. Since in the entire pulse spectrum additional peaks, produced by the radiation S, may occur in the measurement spectrum MS in addition to the peak PE produced by individual electrons, the output signal of the detector DV is first fed by way of a stabilisation channel SK to a determination device BEP for the peak PE produced by individual electrons. The output signal of the determination device BEP is then passed to a control device Re, which controls the detector or its internal amplification.

The determination device BEP for determining the position of the peak produced by individual electrons may for example (see also FIG. 3) be composed of two single-channel or channel discriminators KD1 and KD2 whose output is connected to a pulse rate comparator IV. The two desired values of the channel discriminator KD1 may be so selected that they lie on the front flank of the peak PE, while the desired values of the second channel discriminator KD2 are adjusted to the rear flank of the peak PE. Instead of the four desired values, it is possible to adjust the channel discriminators KD1 and KD2 to three desired values, the two middle values of an adjustment comprising four desired values being made equal. The pulse rate comparator IV following the channel discriminators determines on the basis of the number of pulses detected by the channel discriminators whether the peak detected is the drift stabilisation peak PE originating from individual electrons.

Instead of being constructed in the manner described above, the determination device BEP may comprise an integral discriminator which determines a desired pulse rate. For this purpose the integral discriminator is given, in the static range of the peak PE produced by individual electrons, an actual value from which the number of pulses is determined through the stabilisation channel. Through the achievement of a determined desired pulse rate as an empirical value it is possible in this way to determine the position of the peak PE produced by individual electrons.

The position of the reference line of the individual electron peak PE in the pulse spectrum characteristic of the radiation occurring is fed to the control device RE following the stabilisation channel. The control device RE uses this drift-free reference line to control the detector DV by way of a controlled variable determined from the entire pulse amplitude spectrum. For example, the voltage applied to the detector may be raised or lowered by means of this controlled variable.

The basic control device shown in the block circuit diagram in FIG. 2 can be used both for nuclear radiation measurement techniques and for photometry. In nuclear radiation measurement techniques it is possible to produce the individual electrons forming the reference line or the peak PE by means of a light source in the detector itself or outside the detector. The light source used may be either direct or indirect light, coming in both cases from, for example, a light emitting diode or, in the latter case, from a phosphorescent or persistent luminescent light source for example an NaI scintillation crystal of a photomultiplier emitting, preferably, weak light. In this last case, however, it is necessary that the light energy falling on the detector should be greater than the work function of the electrons from the electron source, which is for example, the photocathode of a photomultiplier. The individual electrons producing the peak PE may however also originate from spontaneous surface emissions of electrons, for example, from cathode noise, noise of a subordinate dynode, particularly the first dynode, of a photomultiplier, field emissions, or from the emission of exoelectrons in proportional counter tubes.

When the control device is used in photometry, the reference line, used for drift stabilisation, of the peak PE can be provided by photoelectrons produced by the measurement signal itself. In addition to this direct production by the measurement signal, it is also possible to use fluorescent filters, for example with pulsed light, e.g. in telecommunication engineering or in light scanning processes, stray laser light in laser measuring techniques, or bio-luminescence in biochemical measurement techniques, for the production of the individual electrons.

In the field of photometry the control device is suitable as a control circuit, for example in conjunction with a photomultiplier when used as the detector, with equivalent light amplifiers or image or channel intensifiers, for example channel plate electron multipliers.

Figure 3:
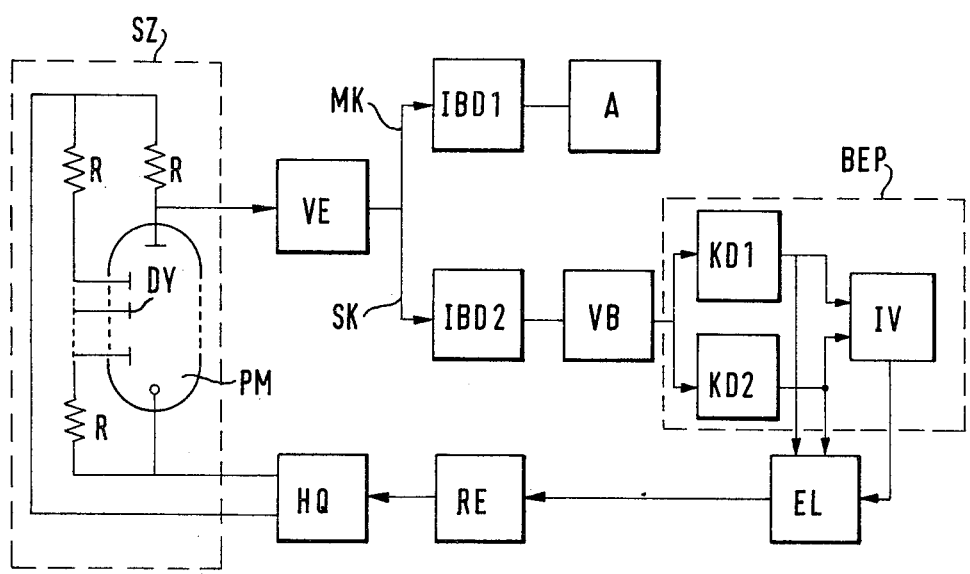
FIG. 3 shows a block circuit diagram of a control device of a scintillation counter with a photomultiplier.

FIG. 3 shows an example of the application of the control device in nuclear radiation measurement. A scintillation counter SZ used as a detector is connected to a high voltage source HQ. The scintillation counter SZ consists of a photomultiplier PM provided with a plurality of dynodes DY. The dynodes are equipped with resistors R for voltage division. In dependence on the desired amplification, the output signal of the scintillation counter SZ is passed to an external amplifier VE. This amplified signal is fed on the one hand to the measuring channel MK and on the other hand to the stabilisation channel SK.

The signal is fed by way of a pulse width discriminator IBD1 to a display and/or evaluator device A. Like the measuring channel MK, the stabilisation channel SK first contains a pulse width discriminator IBD2, to the output of which is connected an amplifier with limiter VB. In series with this amplifier VB is connected the determination device BEP for determining the position of the peak PE produced by individual electrons. The determination device BEP is composed of two channel discriminators KD1 and KD2 connected in parallel and followed by a pulse rate comparator IV. The signals of the respective channel discriminator KD1 or KD2 and the output signal of the pulse rate comparator IV are passed to a latching logic system EL which precedes the control device RE. The controlled variable produced by the control device closes the control circuit of the control device through the high voltage source HQ.

For the purpose of explaining the functioning of the circuit, the starting point taken will be a scintillation counter which is used in nuclear radiation measurement and which consists of a photomultiplier having a sodium iodide scintillation crystal. Instead of this detector, it would be possible to use a proportional counter tube or a semiconductor with internal amplification. The phosphorescence or persistent luminescence of an NaI scintillation crystal, which is usually not taken into account, or which is even regarded as disadvantageous, constitutes here a suitable source for the production of the individual electrons.

The sodium iodide crystal contained in the scintillation counter SZ thus serves as a light source for the production of the individual electrons for the driftstable peak PE or reference line. In dependence on the amplification of the photomultiplier, which can for example be roughly in the range between $4\times 10^4$ and $10^7$, the output signal of the scintillation counter SZ is amplified in the external amplifier VE to an order of signal size convenient for evaluation. The pulse width discriminator IBD1 disposed in the measuring channel MK is designed with a relatively large time constant in comparison with the pulse width discriminator IBD2 disposed in the stabilisation channel SK. For example, the time constant of IBD1 is 230 ns compared with about 30 ns of IBD2. By this design only relatively short pulses, for example the individual electron pulses which produce the reference line or the peak PE, are evaluated through the control channel SK. In the measuring channel MK itself, on the other hand, all pulses lying within the time constants of the pulse width discriminator IBD1 are processed.

For the amplification of the pulses having a small pulse height the pulse width discriminator IBD2 is followed by an amplifier VB with amplitude limiting. The weak pulse produced by individual photoelectrons is thereby amplified again, while pulses of a higher level are limited. The determination device BEP, connected in series in the stabilisation channel, functions in accordance with the description given in connection with FIG. 2. The determination device BEP makes it possible for the control device to distinguish a statistical peak of the measurement spectrum MS (FIG. 1) from the peak PE produced by the individual electrons, for example on commencement of the radiation. In order to retain this peak PE and consequently the reference line governing the controlled variable, the output signals of the two channel discriminators KD1 and KD2 and of the pulse rate comparator IV are passed to a latching logic system EL connected in series with the determination device BEP. This latching logic system EL is adjusted to a minimum pulse rate relationship between the measuring pulse rate and the stabilisation pulse rate. Instead of this adjustment, the latching logic system EL may be adjusted to a minimum pulse rate in the upper pulse amplitude spectrum. This latching logic system EL maintains the value of the reference line without drift, so that the control device RE following the latching logic system EL can be used for determining the controlled variable from the drift-stable value, namely the reference line of the peak PE produced by individual electrons. The controlled variable produced by the control device RE controls the high voltage source HQ and hence the photomultiplier PM of the scintillation counter.

The present control device can be used not only in the fields of nuclear radiation measurement and photometry, but for example also in gamma cameras and in X-ray structure measurements using proportional counter tubes. In the case of gamma cameras for example 17 to 90 photomultipliers are disposed side by side close behind a large or greatly extended NaI crystal, wherein each of the individual multipliers should have common drift stabilisation. In the case of X-ray structure measurement a characteristic line, e.g. $K_\alpha$ radiation, is shielded and is measured with drift stabilisation. In both applications NaI scintillation crystals are again found to be particularly suitable.

We claim:

1. A method of automatically stabilising drift in radiation measurement comprising the steps of: supplying radiation to a detector for absorption thereby; provision by the detector of pulses whose pulse amplitude corresponds to the energy of the radiation absorbed by the detector and extends over a pulse amplitude spectrum; deriving a control signal from a peak in the pulse amplitude spectrum, said peak being the peak resulting from individual electrons; and using the control signal to stabilise the drift of the detector.

2. Method as claimed in claim 1 when used for nuclear radiation measurement.

3. Method as claimed in claim 2 wherein the peak is produced by individual electrons provided by a light source disposed inside the detector.

4. Method as claimed in claim 2 wherein the peak is produced by individual electrons provided by a light source disposed outside the detector.

5. Method as claimed in claim 3 or claim 4 wherein the single electrons are provided by a light source which is a direct light source.

6. Method as claimed in claim 3 or claim 4 wherein the single electrons are provided by a light source which is an indirect light source.

7. Method as claimed in claim 3 or claim 4 wherein the single electrons are provided by a light source which is a light emitting diode.

8. Method as claimed in claim 6 wherein the single electrons are provided by a light source which is a phosphorescent or persistent luminescent light source.

9. Method as claimed in claim 8 wherein the single electrons are provided by a light source which is a sodium iodide scintillation crystal.

10. Method as claimed in claim 9 wherein the detector is a photomultiplier.

11. Method as claimed in claim 2 wherein the peak is produced by individual electrons provided by spontaneous surface emission.

12. Method as claimed in claim 11 wherein the spontaneous surface emission is cathode noise.

13. Method as claimed in claim 11 wherein the spontaneous surface emission is field emission.

14. Method as claimed in any one of claims 11 to 13 wherein the spontaneous surface emission are exoelectrons.

15. Method as claimed in claim 14 wherein the detector is a proportional counter tube.

16. Method as claimed in claim 1 when used in photometry.

17. Method as claimed in claim 16 wherein individual electrons are produced by photoelectrons.

18. Method as claimed in claim 17 wherein the photoelectrons are produced by the signal being measured.

19. Method as claimed in claim 16 wherein individual electrons are provided by fluorescent filters.

20. Method as claimed in claim 16 wherein the individual electrons are provided by stray laser light.

21. Method as claimed in claim 16 wherein the individual electrons are provided in the detector by bioluminescence.

22. Method as claimed in claim 1 used for the detector of a gamma camera.

23. Use of the method as claimed in claim 1 in X-ray structure measurements employing proportional counter tube detectors.

24. Radiation measurement apparatus comprising: a detector means for absorbing radiation and for providing pulses whose pulse amplitude corresponds to the energy of the radiation absorbed by it and extends over a pulse amplitude spectrum; a determination means, connected to the output of said detector means, for deriving a control signal from a peak in the pulse amplitude spectrum, said peak being the peak resulting from individual electrons; and a control means, connected between said determination means and said detector means, for automatically stabilising the drift of said detector.

25. A control apparatus as claimed in claim 24 wherein the determination means comprises two channel discriminators connected in parallel and a pulse rate comparator connected to their outputs.

26. A control apparatus as claimed in claim 24 wherein the determination means comprises an integral discriminator for determining a desired pulse rate.

27. A control apparatus as claimed in claim 24 or claim 25 including a measuring channel having a first pulse width discriminator for large pulse widths, connected to the output of said detector; and a stabilisation channel, including said determination means and said control means, and having a second pulse width discriminator for small pulse widths connected between said output of said detector means and said determination means.

28. A control apparatus as claimed in claim 27 wherein said stabilisation channel further includes an amplifier which limits the pulse amplitudes in the stabilisation channel.

29. A control apparatus as claimed in claim 24 wherein the control means limits the control range of the detector means.

30. A control apparatus as claimed in claim 24 or claim 25 or claim 26 further comprising a latching logic system connected between the output of said determination means and said control means, said logic system discerning the peak in the pulse amplitude spectrum resulting from individual electrons from at least one other peak in the pulse amplitude spectrum and adjusting to a minimum pulse rate relationship between the stabilisation pulse rate and the measurement pulse rate.

31. A control apparatus as claimed in claim 24 or claim 25 or claim 26 further comprising a latching logic system connected between the output of said determination means and said control means, said logic system discerning the peak in the pulse amplitude spectrum resulting from individual electrons (the stabilisation impulse rate) from at least one other peak in the pulse amplitude spectrum (the measurement pulse rate) and to adjusting to a minimum pulse rate in the upper pulse amplitude spectrum.

32. A control apparatus as claimed in claim 24 or claim 25 including a measuring channel having a first pulse width discriminator for large pulse widths connected to the output of said detector means; and a stabilisation channel, including said determination means and said control means, and having a second pulse width discriminator for small pulse widths connected between said output of said detector means and said determination means; and an amplifier connected in said stabilisation channel to limit the pulse amplitudes in the stabilisation channel wherein the control means limits the control range of the detector.

33. A control apparatus as claimed in claim 24 or claim 25 including a measuring channel having first impulse width discriminator for large pulse widths connected to the output of said detector means; and a stabilisation channel including said determination means and said control means, said stabilisation channel further including the series connection of a second pulse width discriminator for small pulse widths and an amplifier which limits the pulse amplitudes in the stabilisation channel, wherein the control means limits the control range of the detector means, connected between the output of said detection means and said determination means, and a latching logic system connected between the output of said determination means and said control means, said logic system discerning the peak in the pulse amplitude spectrum resulting from individual electrons (the stabilisation impulse rate) from at least one other peak in the pulse amplitude spectrum (the measurement rate) and adjusting to a minimum pulse rate relationship between the stabilisation pulse rate and the measurement pulse rate.

34. A control apparatus as claimed in claim 24 or claim 25 including a measuring channel having a first pulse width discriminator for large pulse widths connected to the output of said detector means; and a stabilisation channel including said determination means and said control means, said stabilisation channel further including the series connection of a second pulse width discriminator for small pulse widths and an amplifier which limits the pulse amplitudes in the stabilisation channel, wherein the control means limits the control range of the detector means, connected between the output of said detector means and said determination means, and a latching logic system connected between the output of said determination means and said control means, said logic system discerning the peak in the pulse amplitude spectrum resulting from individual electrons (the stabilisation impulse rate) from at least one other peak in the pulse amplitude spectrum (the measurement pulse rate) and adjusting to a minimum pulse rate in the upper pulse amplitude spectrum.

* * * * *